United States Patent [11] 3,576,097

[72] Inventor Ralph W. Speiser
 Minneapolis, Minn.
[21] Appl. No. 785,421
[22] Filed Oct. 17, 1968
 Division of Ser. No. 390,704, Aug. 19, 1964,
 Pat. No. 3,410,063.
[45] Patented Apr. 27, 1971
[73] Assignee Toro Manufacturing Corporation
 Minneapolis, Minn.

[54] ADJUSTABLE REEL MOWER
 13 Claims, 5 Drawing Figs.
[52] U.S. Cl. .................................................... 56/249
[51] Int. Cl. ............................................. A01d 55/20
[50] Field of Search .......................................... 56/7, 26,
 249, 294, 249.5—254

[56] References Cited
 UNITED STATES PATENTS
2,253,924  8/1941  Worthington .................  56/253
3,106,813  10/1963  Strasel .............................  56/249
2,671,300  3/1954  Kinkead .......................  56/249
 FOREIGN PATENTS
1,001,264  8/1965  Great Britain ................  56/249

Primary Examiner—Russell R. Kinsey
Attorney—Vernon A. Johnson

ABSTRACT: A yieldable adjustable mechanism for controlling the cutting relationship between the rotating blades and stationary bed-knife of a reel mower in which the reel is mounted on the supporting frame for pivotal movement relative thereto about an axis spaced from but parallel to the axis of the reel. The reel includes a lug which is threadedly engaged by an adjusting bolt, which bolt is supported by an end plate of the frame and is rotatable and slidable relative thereto. Turning of the bolt adjusts the cutting relationship between the reel and the bed-knife and if the cutting reel moves upwardly such as by interposition of an object between the reel and the bed-knife, the bolt slidingly yields relative to the end plate which normally supports it. A coiled spring is mounted on the bolt and interposed between the lug and the frame to continuously bias the reel towards the bed-knife. Mechanism for adjusting the tension of the spring comprising a threaded sleeve slidably and rotatably mounted on the bolt and a nonrotatable lug threadedly engaged with said sleeve are interposed between the spring and the frame whereby turning of the sleeve causes movement of the lug, which movement varies the tension on the spring.

The following disclosure contains a correct and full description of the invention and of the best mode known to the inventor of taking advantage of the same.

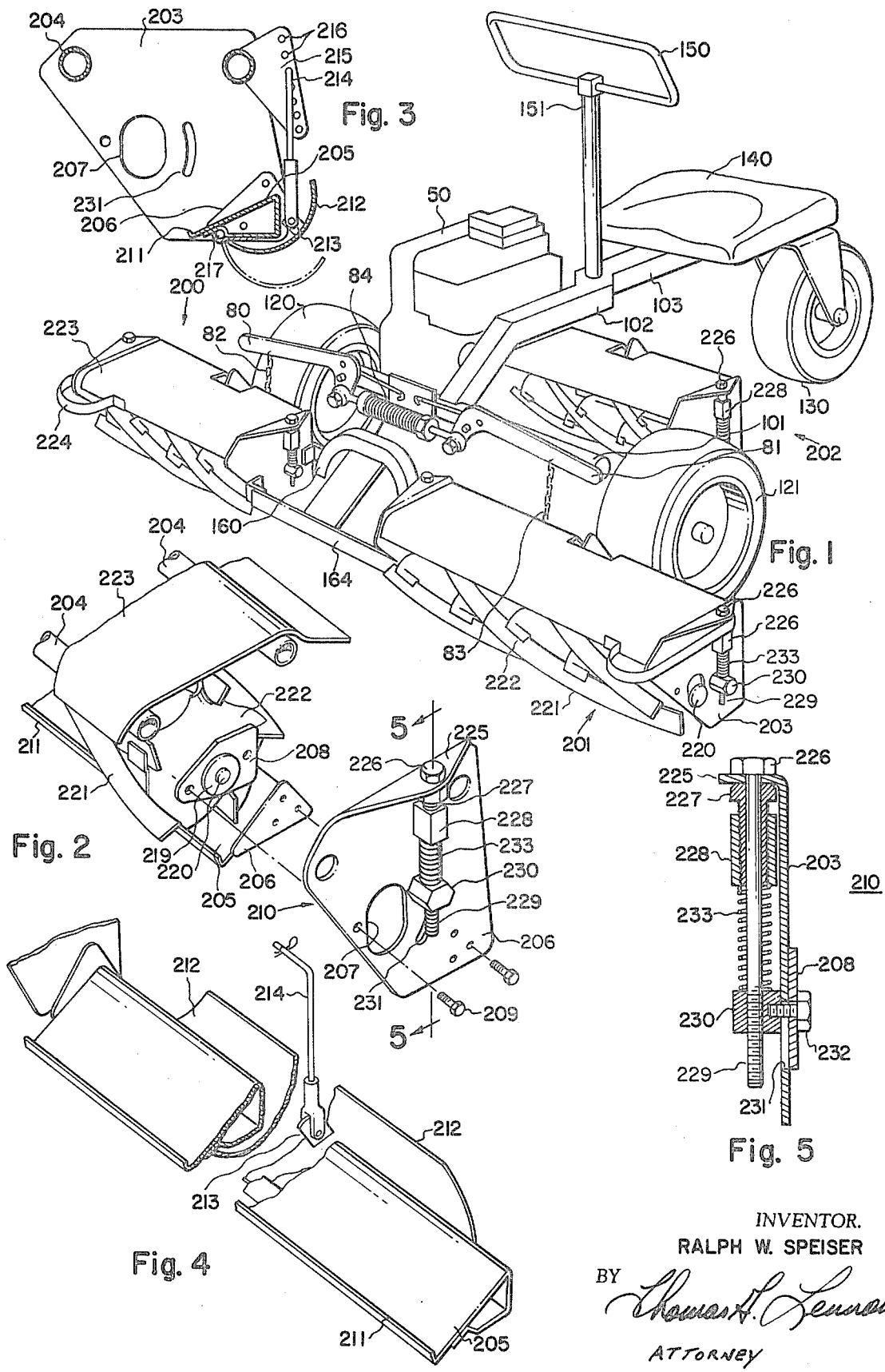

ADJUSTABLE REEL MOWER

This a division of application Ser. No. 390,704, filed Aug. 19, 1964.

This invention relates to an improved multiple mowing unit traction mowing machine, and more particularly, to a machine in which the mowing units are grouped in overlapping relationship about a small and compact traction vehicle, and in which the mowing elements of each unit are operated from the power source on the traction vehicle, and especially to novel means for adjusting and controlling the relationship between the reel and the bed-knife when the mowing units are reel-type mowers.

Riding lawn mowers suitable for institutional, commercial, or park use, or for use on estates and the like where large expanses of grass are to be cut, are commonly in widespread use, and a plurality of tractor mounted reel mowers mounted in overlapping relation continues to provide a better answer for such uses.

Thus, it is the principal object of my invention to provide a riding vehicle and mower assembly, wherein several reel mowers are mounted in slightly overlapping relation to provide a wide-swath mowing configuration, and wherein novel means are provided for adjusting and controlling the relationship of the reel and bed-knife and for preventing damage or stalling when an obstruction such as a stone or stick is interposed between the reel and the bed-knife.

This and other objects of the invention will become apparent from a careful analysis of the specification and drawings, in which:

FIG. 1 is a perspective view of my overall machine, viewed from the left front corner, FIG. 2 is a perspective exploded view showing the relationship of the components at the end of one of my reel-mower assemblies, FIG. 3 is a cross-sectional side view of one of my reel mower units viewed adjacent to the height of cut adjusting apparatus, FIG. 4 is a perspective view of my combined bed-knife and bed-bar arrangement, together with the full length skid and height of cut adjusting device, all of which form a part of each complete reel mower unit, FIG. 5 is a cross-sectional view of my reel adjusting assembly, taken along the line 5–5 of FIG. 2.

THE FRAME

The basic frame of my mower is best seen in FIG. 1. A generally T-shaped main frame includes tubular cross member 101 and the base of the T consists of channel members 102 and 103 secured together by bolts or other suitable means as shown. The forward most portion of member 102 is downwardly curved as is best illustrated in FIG. 1 and welded at its forward end to cross member 101. The rearward end of member 103 is supported by wheel 130 and interconnecting linkage, and the operator's seat 140 is mounted thereabove. The forward end of member 103 is provided with a suitable bushing or bearing (not shown) to receive upstanding shaft 151 of the steering assembly. The steering wheel or handle 150 is mounted at the upper end of shaft 151.

The forward portion of the vehicle is supported on wheels 120 and 121.

THE REEL-MOWERS

The details of each reel-mower assembly will be best understood by reference to FIGS. 2 through 4, inclusive. The reels are constructed to include matching end plates 203 at either end. The end plates are held in spaced parallel relation by intermediate frame members 204 which are securely attached between end plates 203 either by welding directly as shown, or by means of suitable mounting brackets, and by my combined bed-knife and bed-bar 205 which is provided with integral mounting brackets 206 welded at either end. Suitable fastening devices such as screws or bolts are used to fasten members 203 and 206.

Endplate 203 is provided with an opening 207, and a bearing plate 208 is pivotally mounted to endplate 203 adjacent said opening by bolt 209, which is sized so as to be somewhat smaller in diameter than the corresponding hole in bearing plate 208. A bearing 219 is carried by said bearing plate 208 as shown, and rotatably supports reel shaft 220. The reel shaft 220 and a portion of bearing 219 extend partially through the opening 207. This assembly is, of course, duplicated at each end of the overall reel-mower assembly.

The overall reel consists of said shaft 220, a plurality of spirally-shaped blades 221, and a plurality of spiders 222, as shown, all of which are welded into an integral assembly and supported in the overall reel-mower assembly by bearing plates 208 as described. Reel-shaft 220 is power driven, and by proper adjustment of reel adjustment assembly 210, the blades 221 rotate in close shearing fit with upstanding edge 211 of member 205.

The operation of the reel adjustment assembly will be best understood from FIGS. 2 and 5, wherein the assembly is shown in perspective and cross-sectional views, respectively. It is the basic function of this assembly to raise and lower the reel blades 221 with respect to upstanding edge 211 of my combined bed-knife and bed-bar 205. This is accomplished by rotating bearing plate 208 about bolt 209. As bearing plate 208 is rotated slightly about bolt 209, reel shaft 220 is correspondingly raised and lowered to permit the necessary adjustments.

The rotational movement of bearing plate 208 about bolt 209 is accomplished by adjustment of reel adjust assembly 210. End plate 203 at each end of the reel assembly provides the basic supporting element for reel adjust assembly 210, the support being provided through bracket 225 which is formed as an integral part of endplate 203 as shown, and which is provided with a hole to receive the main adjusting bolt 229, having a hex-head 226 at the upper end. The lower end of bolt 229 threads into lug 230 as shown, and capscrew 232 is positioned through slot 231 in endplate 202 and threaded into lug 230 at right angles to bolt 229. It should be noted that capscrew 232 is also positioned through the rearward end of bearing plate 208 and through arcuate slot 231 in endplate 203, and threads into lug 230. Thus, it is apparent that vertical movement of lug 230 and capscrew 232 along slot 231 thereby causes a corresponding rotary movement of bearing plate 208 about bolt 209; and that a close shearing fit between blades 221 and bed-knife 211 can be achieved by appropriately adjusting bolt 229 at each end of the overall reel-mower assembly.

When the mower is in operation, a stone, twig, small piece of metal, or other obstructing object is infrequently struck by one of the blades 221 and is pinched between the blade 221 and bed-knife 211. When that occurs, my reel adjustment assembly 210 is effective to permit the blade 221 and bed-knife 211 to be forced apart and thereby avoid a stalled condition, bending of the blade, or some other damage to the mechanism. This obstruction release mechanism includes threaded sleeve 227, lug 228, and coil spring 233. Threaded sleeve 227 is provided with a hex-head nut at the upper end, and is externally threaded along its length so as to thread into mating internal threads in lug 228. Sleeve 227 is provided with a center bore slightly larger than the outer diameter of bolt 229, to permit relative vertical movement between bolt 229 and sleeve 227. It should also be noted that in the assembled position, lug 228 is relatively close to end plate 203, and it is therefore prevented from rotating with respect to the endplate as the spring tension is adjusted. This adjustment is made by using a wrench on the hex-head portion of threaded sleeve 227 to thereby cause downward vertical movement of lug 228 along sleeve 227. As lug 228 moves downwardly, spring 233 is compressed between lugs 228 and 230, and it is this spring force that holds reel blades 221 in close sheering fit with bed-knife 211. When an obstruction occurs, an upward force is exerted on the reel assembly to cause a corresponding upward force on bearing plate 208 and lug 230. When this upward force on lug 230 is greater than the downward force exerted by spring 231, lug 230 then forces bolt 226 upwardly through sleeve 227, further compressing spring 233, and causes hex-head 226 to move away from bracket 225. Thereafter, when the obstruction clears itself or is cleared by the operator in the even that a stall occurs, spring 233 restores the reel blades into close sheering fit with bed-knife 211.

Each of the reels is supported on the ground by means of a skid 212 which extends approximately the full width of the mower and is shaped in a generally arcuate configuration as is most clearly seen in FIG. 3. Each reel is provided with a height of cut adjustment assembly including a bracket 215 welded to intermediate frame member 204 at the approximate center thereof, and bracket 215 is provided with a series of holes 216, as shown. A lug 213 is welded to skid 212 in vertical relation with respect to bracket 215, and an adjusting rod 214 is pivotally mounted to lug 213 as shown. The height of cut is adjusted as is most clearly seen in FIG. 3 by moving the upper end of rod 214 vertically with respect to bracket 215, and inserting the upper end of rod 214 through the desired hole 216 and securing it with a cotter pin. As the height of cut adjustment is made, skid 212 pivots with respect to member 205 about pins 217 which are securely welded at either end of skid 212, and which are rotatably secured to bed-bar 205.

The reel-mower units that have been hereinabove described are light in weight, inexpensive to manufacture, and convenient to maintain. There are no wheels or rollers as are used in conventional reel units, and the height of cut and reel adjustments are simple but effective. It will be noted in FIG. 1 that shaft 220 of unit 200 extends through its left-hand endplate 203 to the left. It should also be noted that I have found it desirable to use sheet metal covers 223 over the top of each unit, which are fastened between intermediate frame members 204 by any suitable means; and that the assemblies 200 and 201 are preferably provided with bumper guards 224 shaped and positioned as shown in FIG. 1.

THE HITCHES

The several reel-mower units described above, are attached to the basic wheeled frame of the vehicle by means of specially designed hitches that are effective to permit relatively independent vertical movement of each mower unit so as to provide relatively uniform mowing over irregular turf.

The front hitch consists of four basic components, including yoke 160 which is pivotally attached at either end to reel-mower units 200 and 201, respectively; a push rod which is connected between the frame and the lower right corner of yoke 160; a push rod which is connected between the vehicle frame and the lower left corner of yoke 160; and a push rod assembly which is connected between the vehicle frame and the upper center portion of yoke 160.

Reel mower units 200 and 201 are attached together by means of a strap 164 and U-shaped yoke 160.

This method of attachment permits substantially independent vertical movement of the two mower units 200 and 201 with respect to one another, while at the same time maintaining them in substantial lengthwise alignment as viewed from the top.

A further feature of my machine, and one which is effective to place approximately 70 per cent of the weight of the reel-mower units and hitch assemblies on the wheels of the vehicle, is the simple, inexpensive and effective mechanism that is used to suspend the mower units from the basic wheeled frame. This suspension arrangement, with respect to the front mowers, is best seen in FIG. 1, and consists of cantilever arms 80 and 81, chains 82 and 83, and compression spring 84. Cantilever arm 80 is pivotally attached to frame number 101, and compression spring 84 is connected to the lower extremity of arm 80. Similarly, arm 81 is pivotally attached to frame number 101, and the lower extremity of arm 81 is connected to the other end of compression spring 84. The longitudinal forces exerted by spring 84 are effective to force the lower extremities of the two cantilever arms 80 and 81 apart, thereby raising the outer ends of arms 80 and 81. This lifting action is thence carried to the reel-mower assemblies 200 and 201, by means of chains 82 and 83, respectively, and by proper selection of the size of spring 84, I have found it possible to effectively transfer approximately 70 percent of the weight of the two reel units and hitch assembly onto the wheels of the vehicle, thereby minimizing the weight of the reels on the turf.

As is the case with the front mowers as described above, the trailing reel mower unit 202 is provided with means for shifting a substantial portion of the total weight of the mower unit to the frame of the vehicle. This is accomplished by means of a spring and piston assembly.

While there has been described what is at present considered to be the preferred embodiment of this invention, it will be obvious to those skilled in the art that various changes and modifications may be made therein without departing from the invention and it is, therefore, aimed in the appended claims to cover all such modifications as fall within the true spirit and scope of the invention.

I claim:
1. A reel-mower comprising:
a frame,
a bed-knife supported by said frame,
a rotatable shaft supported by said frame with a cutter blade assembly in cooperative cutting relationship with said bed-knife,
said shaft and bed-knife being movable relative to one another,
means for adjusting the positions of said shaft and bed-knife relative to each other to thereby alter the cutting relationship therebetween,
and a bolt supported by said frame for rotation and sliding movement relative thereto,
said bolt being threadedly connected with said shaft, and whereby turning of said bolt effects adjustable movement of said shaft relative to said frame and bed-knife.

2. The mower of claim 1, wherein said shaft is mounted on said frame for swinging movement relative thereto about an axis in parallel spaced relation to the shaft axis,
and whereby turning of said bolt effects swinging adjustment movement of said shaft relative to said frame and thereby adjusts the relative distance between the cutter blade assembly and said bed-knife.

3. The mower of claim 1, including a compressed coil spring concentrically mounted on said bolt and biasing said shaft toward operative position and yieldingly resisting movement thereof away from operative position.

4. The mower of claim 3, including adjustable spring tensioning means concentrically mounted on said bolt in sliding relationship therewith and interposed between said spring and frame, and
the adjustment of said tensioning means varying the spring tension without changing the position of said shaft.

5. The mower of claim 4, wherein said spring tensioning means comprises a tensioning assembly which includes a rotatable element and a nonrotatable element,
both elements being coaxially mounted on said bolt which is axially movable relative thereto,
said nonrotatable element being movable axially of said bolt, and
said elements being in threaded engagement with each other whereby turning of said rotatable element effects said axial movement of the nonrotatable element which causes the aforementioned spring tensioning movement of said tensioning assembly.

6. A reel-mower comprising:
a frame,
a bed-knife supported by said frame,
a rotatable shaft supported by said frame with a cutter blade assembly in cooperative cutting relationship with said bed-knife, said shaft and bed-knife being movable relative to one another, means for adjusting the positions of said shaft and bed-knife relative to each other to thereby alter the cutting relationship therebetween, wherein said adjusting means includes a threaded bolt supported by said frame, said bolt being turntable and longitudinally slidable relative to said frame, a lug connected with said cutter blade assembly and in threaded engagement with said bolt whereby turning of said bolt moves said assembly relative to said bed-knife, a coiled spring coaxially mounted on said bolt and biasing said blade assembly towards said bed-knife, tensioning assembly for said spring mounted on said bolt and interposed between said spring and said frame, said tensioning assembly including a first sleeve mounted on said blot in sliding relationship therewith and rotatable relative thereto, said first sleeve being held in engagement with said frame by said spring, said first sleeve being externally threaded, and a second internally threaded sleeve enclosing said first sleeve in threaded engagement therewith, said second sleeve being held against rotation by said frame but movable longitudinally of said blot in response to rotation of said first sleeve, and said second sleeve being adapted to thereby vary the tension of said spring in response to movement of said second sleeve longitudinally of said bolt.

7. A reel-mower comprising:

a frame, a bed-knife supported by said frame, a rotatable shaft supported by said frame with a cutter blade assembly in cooperative cutting relationship with said bed-knife, said shaft and bed-knife being movable relative to one another, means for adjusting the positions of said shaft and bed-knife relative to each other to thereby alter the cutting relationship therebetween, spring biasing means urging the blades and bed-knife into cutting relationship with each other and yieldingly resisting movement of said blades and bed-knife away from each other when an obstruction is interposed between the blades and the bed-knife, and including means operable to adjust the tension of the spring biasing means without moving said blades and bed-knife relative to each other.

8. The mower of claim 7, wherein said means operable to adjust the tension of the spring biasing means is capable of effecting such adjustment without moving the shaft relative to the frame.

9. A reel mower comprising:

a frame, a bed-knife supported by said frame, a rotatable shaft supported by said frame with a cutter blade assembly in cooperative cutting relationship with said bed-knife, said shaft and bed-knife being movable relative to one another, means for adjusting the positions of said shaft and bed-knife relative to each other to thereby alter the cutting relationship therebetween, spring biasing means urging the blades and bed-knife into cutting relationship with each other and yieldingly resisting movement of said blades and bed-knife away from each other when an obstruction is interposed between the blades and the bed-knife, bearing members pivoted to the mower frame coaxially about an axis spaced from and parallel to the shaft axis, the ends of said shaft being carried in and supported by said bearing members, an adjusting bolt carried by the mower frame, at least one of said bearing members being in threaded engagement with said adjusting bolt, and whereby turning of said bolt causes pivotal movement of the bearing members and shaft to adjust the distance between the blades and the bed-knife.

10. A reel-mower comprising:

a frame, a bed-knife supported by said frame, a rotatable shaft supported by said frame with a cutter blade assembly in cooperative cutting relationship with said bed-knife, said shaft and bed-knife being movable relative to one another, means for adjusting the positions of said shaft and bed-knife relative to each other to thereby alter the cutting relationship therebetween, spring biasing means urging the blades and bed-knife into cutting relationship with each other and yieldingly resisting movement of said blades and bed-knife away from each other when an obstruction is interposed between the blades and the bed-knife, said frame including end plates, bearing plates pivotally attached to the respective endplates of the mower frame, an adjusting bolt carried by the mower frame, and at least one of said bearing plates carrying a lug in threaded engagement with said adjusting bolt.

11. A reel-mower comprising:

a frame, a bed-knife supported by said frame, a rotatable shaft supported by said frame with a cutter blade assembly in cooperative cutting relationship with said bed-knife, said shaft and bed-knife being movable relative to one another, means for adjusting the positions of said shaft and bed-knife relative to each other to thereby alter the cutting relationship therebetween, bearing members pivoted to the mower frame coaxially about an axis spaced from and parallel to the shaft axis, the ends of said shaft being carried in and supported by said bearing members, an adjusting bolt carried by the mower frame, at least one of said bearing members being in threaded engagement with said adjusting bolt, whereby turning of said bolt causes pivotal movement of the bearing members and shaft to adjust the distance between the blades and the bed-knife, said frame including endplates bearing plates pivotally attached to the respective endplates of the mower frame, an adjusting bolt carried by the mower frame, at least one of said bearing plates carrying a lug in threaded engagement with said adjusting bolt, and the adjusting bolt being carried by the endplate so that turning of the bolt causes movement of the lug to pivot the bearing plates and the shaft.

12. A reel-mower comprising:

frame means, a bed-knife supported by said frame means, rotatable shaft means supported by said frame means with a cutter blade assembly in cooperative cutting relationship with said bed-knife, said shaft means and bed-knife being movable relative to one another, and an adjusting member extending between said means, the frame means including endplates with the shaft means disposed inwardly therebetween, at least one of said endplates including an outwardly extending flange, a downwardly facing opening in said flange, an opening in said endplate, said shaft means extending laterally through said opening in said endplate, and including a lug element forming a part thereof and disposed outwardly of said endplate, said member being supported by the top of said flange and extending downwardly through said flange opening and rotatable relative thereto, the lower end of said member being threadedly engaged with said lug element, and said shaft means and lug element being movable relative to said endplate in response to rotation of said adjusting member to adjust the relationship between said cutter blade assembly and said bed-knife.

13. The mower of claim 12, wherein said adjusting member is upwardly movable relative to said flange in response to upward movement of said shaft means.